United States Patent [19]
White et al.

[11] 3,915,317
[45] Oct. 28, 1975

[54] APPARATUS FOR COLLECTING ARTICLES IN SEPARATE STACKS

[75] Inventors: Neil S. White; George R. Schindler, both of Rochester, N.Y.

[73] Assignee: Eastman Kodak Company, Rochester, N.Y.

[22] Filed: Sept. 17, 1974

[21] Appl. No.: 506,918

[52] U.S. Cl. .................. 214/6 F; 214/8; 214/8.5 K; 221/310; 271/207
[51] Int. Cl.² ....................................... B65G 57/03
[58] Field of Search ............ 214/6 R, 6 D, 6 H, 6 F, 214/6 BA, 6 S, 8, 8.5 K; 221/307, 308, 309, 310; 271/207, 209, 213, 217, 219

[56] References Cited
UNITED STATES PATENTS

| | | | |
|---|---|---|---|
| 3,193,139 | 7/1965 | Iannone et al. ................ | 221/308 X |
| 3,568,884 | 3/1971 | Petricek ............................. | 221/310 |
| 3,659,728 | 5/1972 | Reinecke ........................... | 214/6 H |

FOREIGN PATENTS OR APPLICATIONS

| | | | |
|---|---|---|---|
| 409,761 | 10/1966 | Switzerland ..................... | 214/6 BA |

Primary Examiner—Robert J. Spar
Assistant Examiner—Leslie J. Paperner
Attorney, Agent, or Firm—S. W. Gremban

[57] ABSTRACT

An article collecting apparatus for continuously collecting articles such as dental X-ray packets punched continuously from an intermittently advanced web. The apparatus comprises a chute, and is provided with fingers extendable into the chute for separating a stack of a specified number of articles from succeeding collected articles, and preventing the additional articles from inadvertently accumulating on the separated stack. The chute is further provided with an elevator mechanism forming part of the chute for transferring the separated stack of articles from the chute to a transfer station. During such transfer, the upper fingers are retracted and lower fingers are extended into the chute to prevent the articles collecting in the chute from inadvertently passing through the chute and accumulating on the stack being transferred.

7 Claims, 7 Drawing Figures

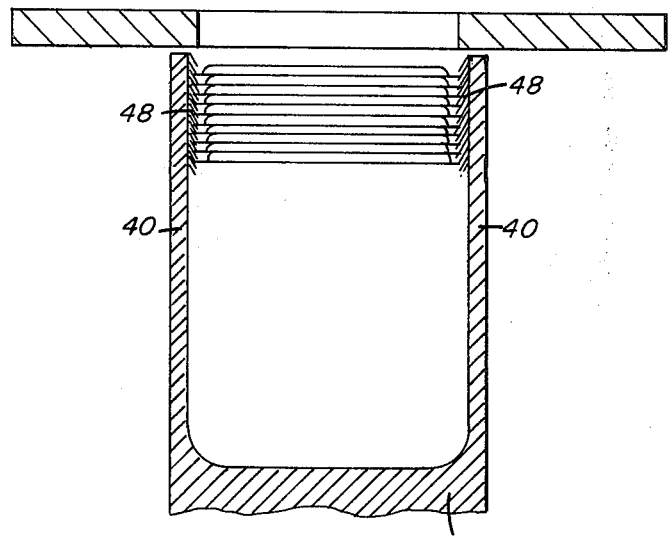
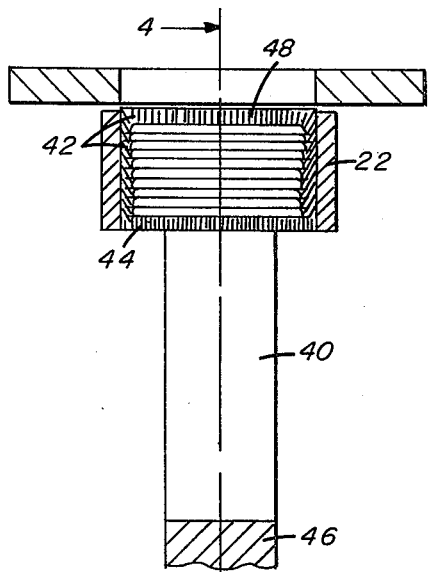
FIG. 4
FIG. 3
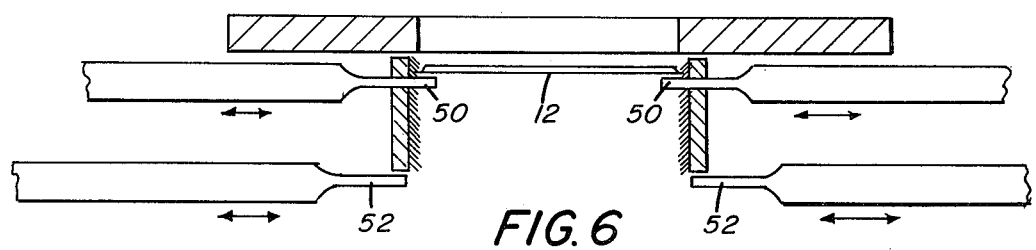
FIG. 6
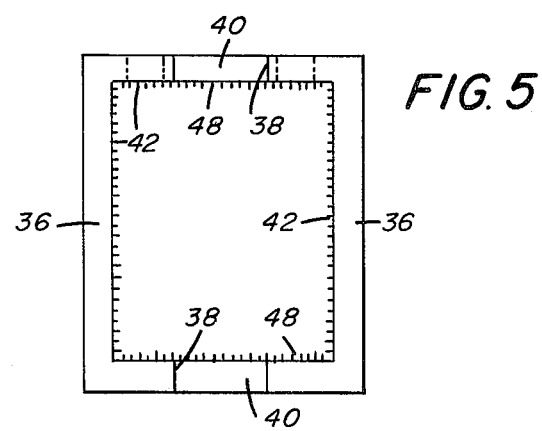
FIG. 5

APPARATUS FOR COLLECTING ARTICLES IN SEPARATE STACKS

BACKGROUND OF THE INVENTION

1. Field of the Invention

This invention relates generally to article collecting apparatus, and more specifically to an apparatus for continuously collecting articles into separate stacks.

2. Description of the Prior Art

It is generally well-known in the art to provide apparatus for collecting articles into stacks, each containing a specified or predetermined number of articles. Exemplary patents describing such apparatus are U.S. Pat. Nos. 2,677,317, 3,550,349 and 3,655,180. Although the prior-art apparatus may operate satisfactorily for relatively large articles, such as bags, it is highly improbable that such apparatus could be used for the high-speed collecting of small articles such as dental packets into separate stacks. Other disadvantages of the prior-art article collecting apparatus is that the collecting, separating and transferring functions cannot be performed simultaneously, the transfer mechanism for transferring a stack of articles from the collecting apparatus is of relatively complicated construction, and the collecting apparatus is bulky and utilizes considerable space.

SUMMARY OF THE INVENTION

In accordance with a preferred embodiment of the invention, an article collecting apparatus is disclosed for continuously collecting articles such as dental packets into separate stacks, and transferring each stack as it is completed from the collecting apparatus. The article collecting apparatus comprises an article receiving chute having an entry opening through which articles are continuously fed in succession, and an exit opening through which an accumulated stack of articles is transferred. The inner surfaces of the chute are provided with a facing material having fibers extending therefrom and inclined downwardly toward the exit opening. The chute is further provided with oppositely disposed slots in opposite sides of the chute extending the full length of the chute for slidably receiving the arms of a reciprocally movable elevator means which is movable between upper and lower positions. The arms have inner arm surfaces lying in the same plane as the corresponding inner side surfaces of the chute, and also provided with a facing material having fibers extending therefrom and inclined downwardly toward the exit opening. Articles fed into the entry opening of the article receiving chute are engaged at least at the opposite ends thereof by the facing material which supports the article in the chute. Means are provided for moving the elevator means to its lower position causing the facing material on the arms to transfer a stack of articles collected in the chute from the collecting apparatus.

More specifically, in this embodiment of the article collecting apparatus, a pusher mechanism is provided for pushing each severed article through the entry opening with at least opposite ends of the article in engagement with the facing material on the arms and chute. Also, a stack separating mechanism is provided having a first finger or fingers movable into the chute adjacent the entry opening for separating an accumulated stack of articles from succeeding articles fed into the entry opening. The separating mechanism further has a second finger or fingers spaced below the first finger and movable into the chute as the first finger is retracted therefrom for preventing a plurality of articles fed into the chute from inadvertently passing therethrough and accumulating on the separated stack being transferred from the collecting apparatus. The elevator means and fingers are all operated in timed relation by any suitable means such as cam means or the like.

It is accordingly one of the objects and advantages of the present invention to provide an apparatus for continuously collecting articles in separate stacks, and which is capable of high speed operation with a minimum of maintenance and control.

Another object and advantage of this invention is to provide an article collecting apparatus that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 3 is an enlarged view of the elevator mechanism of the apparatus illustrated in FIG. 1;

FIG. 4 is a section view taken substantially along line 4—4 of FIG. 3;

FIG. 5 is a top plan view of the article receiving chute of FIG. 3 of this invention;

FIG. 6 is a schematic view in side elevation illustrating the upper and lower fingers used to separate stacks of collected articles.

DESCRIPTION OF THE PREFERRED EMBODIMENT

Figure 1:
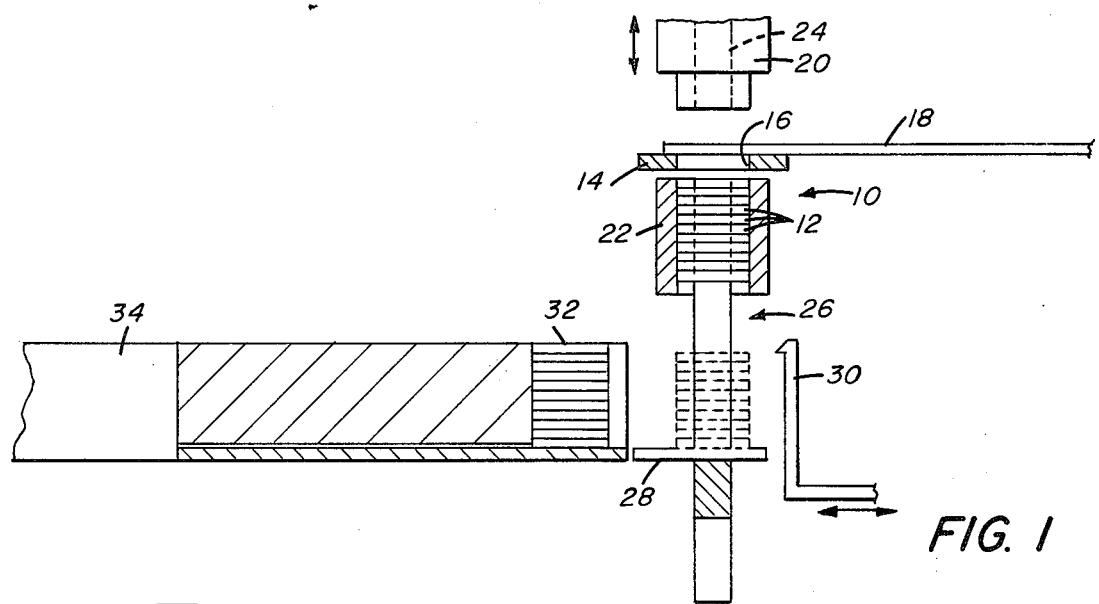
FIG. 1 is a schematic side elevational view partially in section of a preferred embodiment of the article collecting apparatus of this invention.
Figure 2:
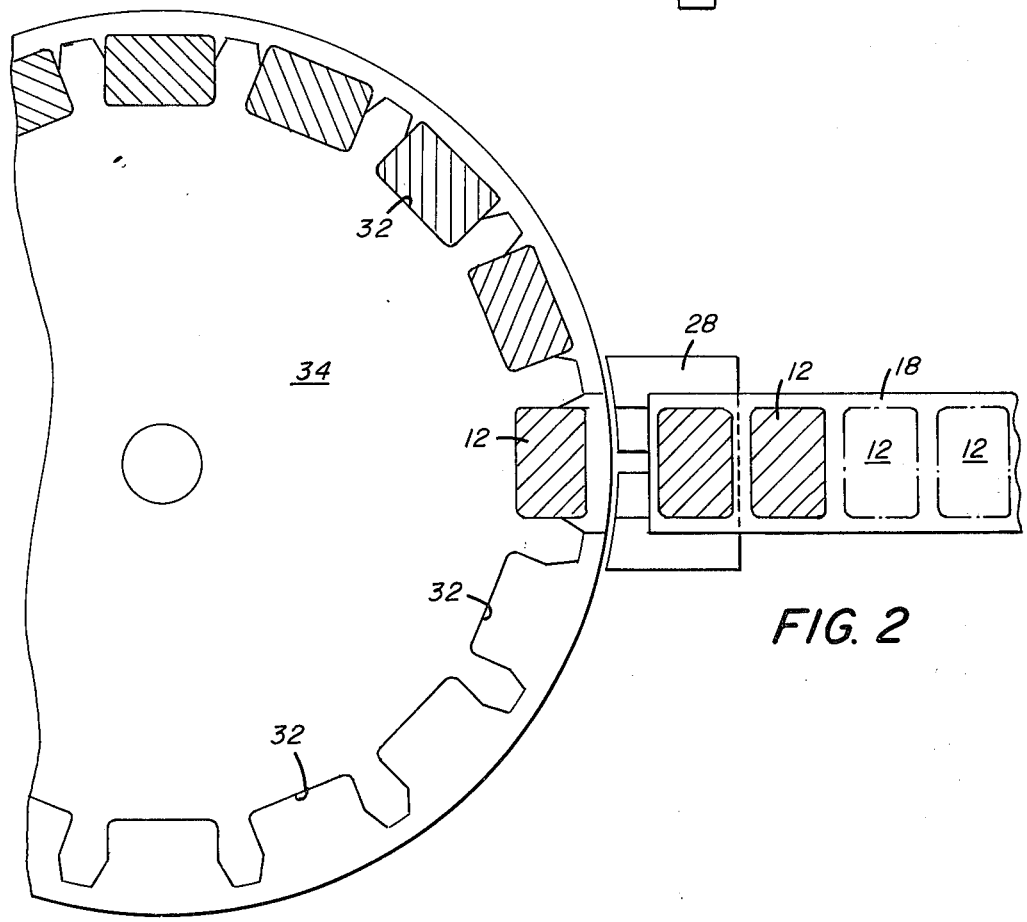
FIG. 2 is a top plan view of the apparatus of FIG. 1.

With reference to FIGS. 1 and 2 of the drawing, an article collecting apparatus 10 is disclosed for continuously collecting articles 12 into separate stacks. A die plate 14 is provided having a die opening 16 over which a web 18 of material such as a web of articles such as dental packets 12 is intermittently transported by any suitable transport mechanism, not shown. The web 18 is guided by any suitable means, not shown, for successively positioning the dental packets 12 into register with die opening 16. A reciprocally movable punch 20 of any suitable type is operated for punching a dental packet 12 from web 18, and then pushing the punched-out packet through an entry opening into an article receiving chute 22. The pushing mechanism may comprise a block 24 reciprocally mounted within the punch 20 and movable outwardly relative to the punch by a separate fluid cylinder or the like, not shown. After a select number or stack of articles 12 is collected in chute 22, an elevator mechanism 26 is operated for transferring the stack from the chute onto a platform 28 at a stack holding station. A stack pusher of any suitable type such as a reciprocally movable plate 30 is operated to transfer the stack of articles from the holding station into an aligned pocket 32 of a rotatably indexed table 34. While this latter transfer operation is taking place, another stack of articles 12 is being collected in chute 22 in preparation for transfer to the holding station and then into another pocket 32. With this apparatus, the articles or dental packets 12 are continuously punched out of web 18, and a selected number or stack collected in chute 22 and then transferred via the holding station to a pocket 32. For the purpose of this invention, reference to a stack of articles 12 collected in chute 22 may refer to a single article as well as a selected number of articles.

With reference to FIGS. 3–5, the article receiving chute 22 is illustrated in greater detail as comprising a pair of U-shaped channel members 36 secured to any suitable stationary frame member, not shown, and spaced apart to define slots 38 for slidably receiving arms 40 of the elevator mechanism. The inner side surfaces of chute members 36 are provided with transfer facings 42 which are secured thereto by any suitable means such as adhesive or the like. The transfer facings 42 are preferably formed from a commercially available material comprising nylon fibers embedded in a polyurethane base in which all of the fibers are parallel to one another and arranged at some angle other than 90° to the base of the facing. The facing material is secured to the inner side surfaces of chute 22 with the fibers extending downwardly toward the exit opening 44 of chute 22. The chute is further arranged so that the opening within the chute is only slightly larger than the outer periphery of an article 12 fed therein so that the outer periphery of the article engages the fibers of the transfer facing 42. The elevator arms 40 extend from a common post 46 which is reciprocally movable by any suitable mechanism, not shown, between an upper position as seen in FIGS. 3 and 4, and a lower position in which the ends of the elevator arms are located at the holding station (FIG. 1). A transfer facing 48 similar to the aforementioned transfer facing 42 is secured to the inner surface of the ends of the transfer arms 40 with the nylon fibers extending toward the exit opening 44 of chute 22. After a group of articles 12 are punched from the web 18 and pushed into the chute as illustrated in FIG. 4, downward movement of elevator arms 40 from the upper position to the lower position to the lower position effectively transports the stack of articles 12 from chute 22 to the holding station. This downward movement of the articles is not resisted by the facing material 42 on the inner side surfaces of chute members 36 since they are inclined downwardly and the edges of the articles 12 in engagement therewith merely slide along the fibers. During downward movement of elevator arms 40, additional articles 12 punched from web 18 are pushed into chute 22 and retained therein by the facing material 42 on the chute members 36. When elevator arms 40 return to their upper position, the transfer facing 48 on the ends thereof due to their inclination merely slide past the newly inserted articles 12 in the chute. The articles, on the other hand, are prevented from moving upwardly by the downwardly inclined fibers on the chute facing 42.

With reference to FIG. 6, a separating mechanism is schematically disclosed for preventing articles 12 newly introduced into chute 22 from inadvertently passing through the chute and landing on top of the stack of articles being transferred to the holding station by the elevator mechanism 26. The separating mechanism comprises a pair of upper fingers 50 movable by any suitable mechanism between retracted and extended positions. The fingers 50 extend through openings in the chute members 36 located on opposite sides of elevator arms 40. When the last article 12 of a stack of articles is fed into chute 22, any suitable means such as a countermechanism controlled by cam or electromechanical means, not shown, actuates elevator mechanism 26 for transporting the completed stack of articles to the holding position. After the elevator mechanism 26 begins its downward movement and before the next article 12 is punched from web 18, upper fingers 50 are moved inwardly to their extended position (FIG. 6) by any suitable mechanism such as cam means or the like for preventing the first article 12 pushed into chute 22 from inadvertently passing therethrough and landing on top of the stack of articles being transported by the elevator mechanism. The upper fingers 50 are preferably retracted before the second article 12 is punched out, and lower fingers 52 similar to upper fingers 50 are moved to their extended position to prevent any additional articles 12 punched out of web 18 from inadvertently passing through chute 22 and landing on top of the transferred stack. The lower fingers 52 remain in their extended position until elevator mechanism 26 returns to its upper position. By this time, approximately seven articles have accumulated in chute 22 and form a base for the remaining articles needed to complete the stack of articles.

Figure 7:
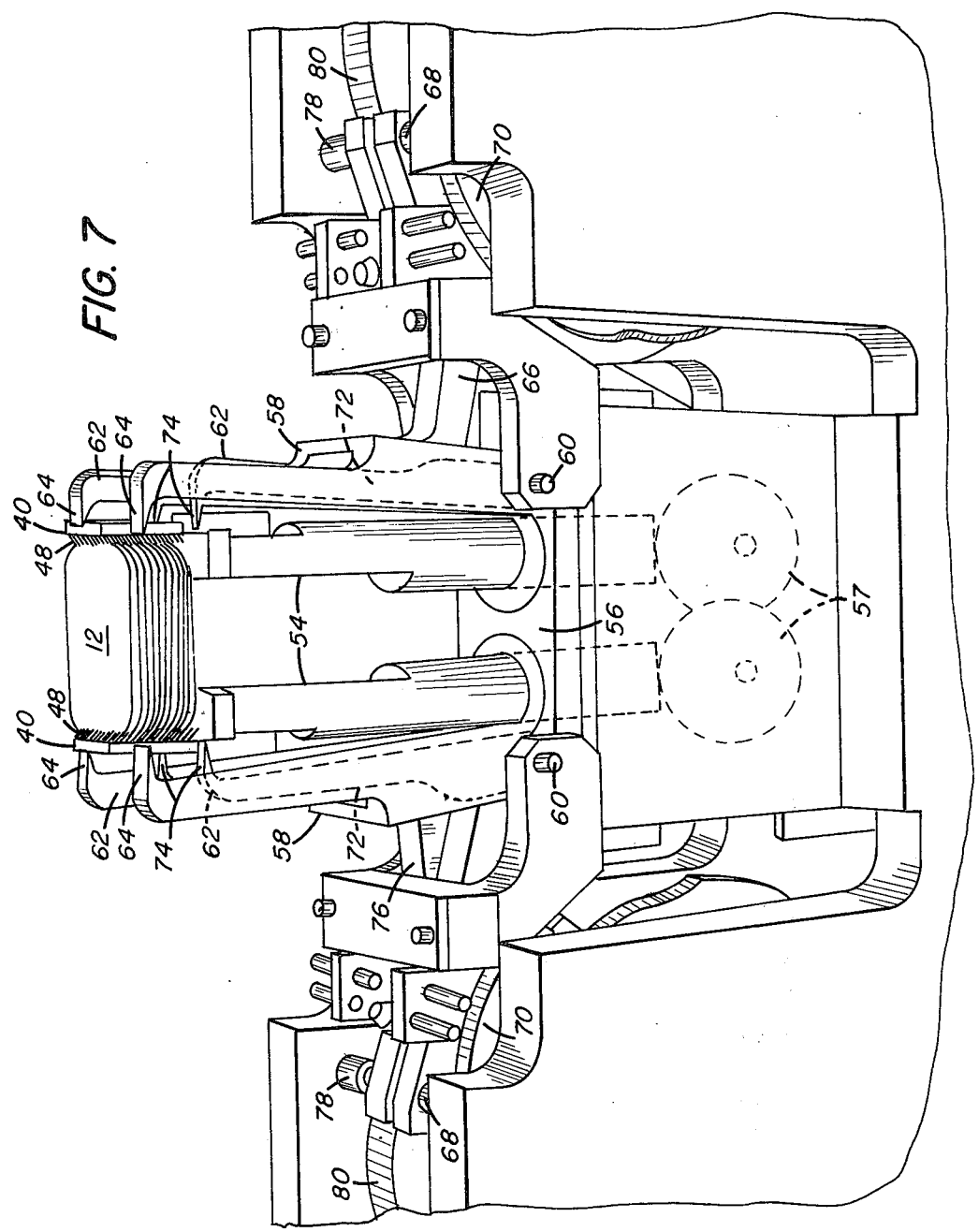
FIG. 7 is a perspective view illustrating one design of the elevator and separating mechanisms with the chute omitted for purposes of clarity.

With reference to FIG. 7, one design of the elevating and separating mechanisms is disclosed with the article receiving chute members 36 omitted for purposes of clarity. In this design, the elevator arms 40 are secured to cylindrical posts 54 which are reciprocally moved within bearings in a frame 56 by any suitable cam wheels 57 or the like rotatably mounted on frame 56 below posts 54. The separating mechanism comprises a pair of outer brackets 58 pivotally mounted on shafts 60 supported by frame 56, and each provided with a pair of upstanding arms 62 having transversely extending upper fingers 64. Each outer bracket 58 further has a laterally extending leg 66 provided with a cam follower 68 at the end thereof riding on the periphery of a cam wheel 70 rotatably supported by frame 56. Movement of cam wheel 70 imparts pivotal movement to bracket 58 and movement of fingers 64 between their extended and retracted positions. Another similar pair of inner brackets 72 are nested within outer brackets 58, and pivotally mounted on the same shafts 60. The inner brackets 72 further have upstanding arms having transversely extending lower fingers 74, and legs 76 extending from inner brackets 72 through notches in outer brackets 58. The legs 76 are provided with cam followers 78 at the ends thereof riding on the periphery of cam wheels 80 rotatably supported by the same shafts as cam wheels 70. Accordingly, on rotation of the elevator and separator cam wheels 57, 70 and 80, the elevator and separating mechanisms are operated in timed relation.

The invention has been described in detail with particular reference to a preferred embodiment, but it will be understood that variations and modifications can be effected within the spirit and scope of the invention as described.

We claim:

1. In an apparatus for continuously collecting articles in separate stacks, the combination comprising:

an article receiving chute having inner surfaces defining an entry opening through which articles are fed in succession, and an exit opening through which a stack of said articles are transferred, said chute further having opposite sides defining slots;

a first facing material on said inner surfaces of said chute, said first facing material having fibers extending therefrom and inclined downwardly toward said exit opening:

reciprocally movable elevator means having arms slidably movable within said slots between an upper position and a lower position, said arms having inner surfaces lying substantially in the same plane as said inner surfaces of said corresponding sides of said chute;

a second facing material on said inner arm surfaces, said second facing material having fibers extending therefrom and inclined downwardly toward said exit opening, said first and second facing materials being engageable in said upper position by opposite ends of a stack of articles fed through said entry opening for supporting said articles; and means for moving said elevator means to said lower position causing said second facing material to transfer said stack of articles from said chute.

2. The invention according to claim 1, and further comprising a pusher member for pushing each article through said entry opening and onto said first and second facing materials.

3. The invention according to claim 1, and further comprising a first finger movable into said chute adjacent said entry opening for preventing a succeeding article fed into said entry opening from being added onto one end of said collected stack of articles as said elevator arms begin to move said stack out of said chute.

4. The invention according to claim 3, and further comprising a second finger spaced from said first finger and movable into said chute as said first finger is retracted therefrom for preventing a plurality of articles fed into said chute from being added onto said one end of said collected stack of articles substantially as said stack is moved out of said chute.

5. The invention according to claim 1, and further comprising a first pair of opposed fingers movable into said chute adjacent said entry opening for preventing a succeeding article fed into said entry opening from being added onto one end of said collected stack of articles as said elevator arms begin to move said stack toward said lower position.

6. The invention according to claim 5, and further comprising a second pair of opposed fingers spaced from said first pair of fingers and movable into said chute as said first pair of fingers are retracted therefrom for preventing a plurality of articles fed into said chute from being added onto said one end of said collected stack of articles as said stack is moved closer to said lower position.

7. The invention according to claim 6, and further comprising cam means coupled to said elevator means and to said first and second pairs of fingers for operating said elevator means and said first and second pairs of fingers in timed relation.

* * * * *